United States Patent [19]

Sheils Dennis

[11] Patent Number: 4,951,487
[45] Date of Patent: Aug. 28, 1990

[54] BICYCLE WHEEL LOCKING MEANS

[76] Inventor: Sheils Dennis, 45 Julie Dr., Glenview, Ill. 60025

[21] Appl. No.: 379,874

[22] Filed: Jul. 14, 1989

[51] Int. Cl.$^5$ ............................................. E05B 71/00
[52] U.S. Cl. ........................................ 70/233; 70/280; 212/304.3
[58] Field of Search ................. 70/203, 202, 201, 210, 70/211, 212, 225, 233, 279; 280/298, 304.3; 301/124 R, 111, 105 B, 37 AT

[56] References Cited

U.S. PATENT DOCUMENTS

| D. 221,417 | 8/1971 | Prichard | D8/113 |
|---|---|---|---|
| 1,280,690 | 10/1918 | Eckert | 70/203 |
| 4,028,915 | 6/1977 | Stahl | 70/210 |
| 4,103,922 | 8/1978 | Brilando | 280/279 |
| 4,114,409 | 9/1978 | Scire | 70/225 |
| 4,290,284 | 9/1981 | Nicksic | 70/233 |
| 4,621,873 | 11/1986 | Weinstein | 70/225 |
| 4,724,692 | 2/1988 | Turin | 70/225 |
| 4,805,941 | 2/1989 | Downing | 280/279 |

Primary Examiner—Robert L. Wolfe
Attorney, Agent, or Firm—Robert E. Browne; Thomas C. McDonough

[57] ABSTRACT

A means for locking a quick-release mechanism on a bicycle wheel hub is disclosed. The means comprises a locking body with two openings formed therein, with the body being, in a preferred embodiment, in the shape of a flat plate. The skewer rod of a bicycle wheel axle or the axle itself is inserted through one of the openings and the shackle of a lock through the other opening, in a manner to prevent the lever arm of the quick-release mechanism from being rotated without the lock being removed.

6 Claims, 1 Drawing Sheet

U.S. Patent
Aug. 28, 1990
4,951,487
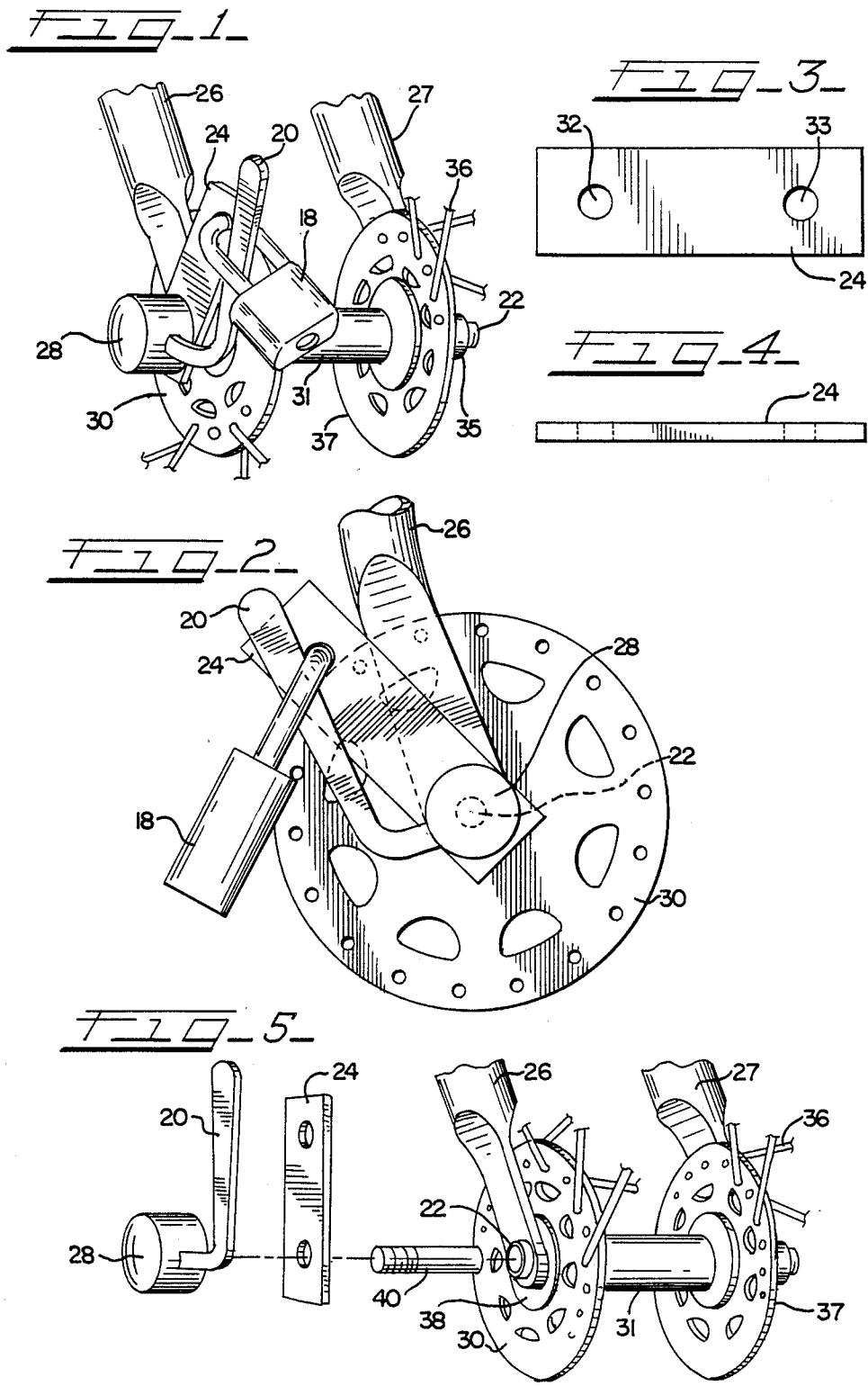

BICYCLE WHEEL LOCKING MEANS

BACKGROUND OF THE INVENTION

The invention disclosed herein relates to the locking of quick-release wheel hubs, particularly those used on lightweight multi-speed bicycles. These bicycles are used generally for touring and non-competitive racing. Either the front wheel or both front and back wheels use quick- release mechanisms for securing the wheel hub to the forks of the bicycle frame. These mechanisms generally consist of a wheel axle with an area at either end to receive the ends of the bicycle forks. At one end of the axle is a tapered nut, and at the other end is a lever arm designed so that its rotation tightens or loosens the hub on the forks.

These quick-release mechanisms allow the rider to quickly remove the wheel for repairs without the use of wrenches or other tools. This feature is particularly useful for repairing flat tires when the rider does not have access to such tools. For this reason, quick-release hubs have become very popular in recent years.

There is, however, a major drawback to the use of quick-release hubs in that their easy removability makes them an inviting target for thieves. Many bicycle riders use hardened steel locks which are less susceptible to cutting, torching, or breaking by thieves than are conventional chains or cables. Due to their rigid shape and the cost of their materials, however, these locks are expensive, bulky and generally not large enough to lock both the front and the back wheel of a bicycle at the same time. If the rear wheel and frame are locked up using this type of lock, the thief can quickly steal the front wheel. Similarly, the thief can steal all but the front wheel if this is all the rider has locked. A common practice, therefore, is for the rider to remove the front wheel when locking the bike to an immovable object and either lock the front wheel to the back wheel or to carry the front wheel with him or her. Both alternatives are time-consuming and inconvenient. A third alternative is to use a chain or cable which is long enough to encompass both wheels and an immovable object when locking the bike. Such chains and cables are inconvenient to carry on the bicycle, however, and are not as safe from theft as are the smaller hardened steel locks. Thus, all of these alternatives are unsatisfactory for the rider. In recent years, different methods have been used to overcome this problem. These methods generally utilize a mechanism to lock the quick-release wheel hub to the bicycle frame while allowing the rider a relatively quick method to remove the hub without the use of tools. These mechanisms generally involve a lock mechanism being placed on the hub at the ends of the wheel axle to secure the axle to the frame. Such a device is disclosed, for example, in U.S. Pat. No. 4,028,915, issued to Stahl. Patent '915 discloses a lock mechanism which is integrally formed with a cover that fits over the lever arm of the quick-release mechanism and prevents the lever arm from being moved. Such a device is effective, but it is also very complicated and expensive, and it can add undesired weight to the bicycle.

SUMMARY OF THE INVENTION

The present invention discloses a simple, inexpensively made device for locking the lever arm of a bicycle quick-release mechanism. These bicycle quick-release mechanisms are well known and generally include a wheel hub rotatably mounted on a bicycle axle. A skewer rod with two threaded ends and end nuts located on either end is movably mounted within said bicycle axle. The two forks of the bicycle frame are mounted on the axle, with each fork held in place between an inner nut (located at either end of the axle and just outside the hub) and one of the end nuts. One of the ends of the said skewer rod is formed with a lever arm, the rotation of which controls the position of its respective end nut. When this lever arm is in its locked position, the two frame forks are held securely. When it is moved to its release position and rotated, the frame forks may be removed from the axle and the wheel may be removed from the bicycle.

This invention presents a method of locking such a quick-release mechanism in a manner that is simple, and inexpensive, yet very effective. The means include a locking device that is a generally rectangular, lightweight, flat metal plate, with two holes formed therein at either end of the plate. One of the holes is slightly larger than the diameter of the skewer rod, and is designed to be placed over the skewer rod on the inside of the lever arm of the quick-release mechanism so that it abuts the end of the axle. The second hole is of sufficient diameter that it may receive the shackle of a standard padlock or combination lock. The plate is positioned so that the shackle of the lock fits through the second hole and also around the lever arm, preventing the lever arm from being rotated, thus preventing the hub from being loosened and the frame forks from being removed.

Thus the rider is presented with an inexpensive yet effective method of locking the front wheel of the bicycle while still retaining easy access to the wheel without the need for carrying a supply of tools. This invention also minimizes the weight which is added to the bicycle, since the only parts added are the small metal plate and the lock. When this locking plate device is used in combination with a small, U-shaped hardened steel lock for locking the rear wheel and frame, the rider need only lock the front wheel with this invention. The rider may, if desired, leave the locking device in the locked position for both riding and storage, and need only remove the lock when repairs to the wheel are needed. Other advantages of this invention are that it requires minimal maintenance and has minimal opportunity for failure or breakdown, and that it is very simple to manufacture.

BRIEF DESCRIPTION OF THE DRAWINGS

FIG. 1 is a perspective view of the invention as it is attached to a bicycle axle, as the axle is attached to the forks of a bicycle frame.

FIG. 2 is a side view of the invention as it is attached to a bicycle axle, as the axle is attached to the forks of a bicycle frame.

FIG. 3 is a top view of the metal plate.

FIG. 4 is a side view of the metal plate.

FIG. 5 is an exploded perspective view of the invention and a bicycle wheel axle and skewer rod.

DETAILED DESCRIPTION OF THE DRAWINGS

FIGS. 1, 2 and 5 illustrate a preferred embodiment of this invention as it is used to lock a quick-release mechanism which is used to removably secure the axle of a bicycle wheel to the forks of a bicycle frame. Not all details of the quick-release mechanism or the bicycle axle are shown in these drawings, as these elements are old and are not part of this invention.

In a front axle and fork assembly 10, one can see axle 22 about which the bicycle wheel (not shown) rotates. Hub 31 is rotatably mounted on axle 22. Axle nut 38 is located on axle 22 and functions to, among other things, hold the bearings within their housing within hub 31. Another axle nut is similarly located on the other end of axle 22, and is not shown. Sprockets 30 are attached to hub 28 and act to hold spokes 36, which in turn hold the rim of the bicycle wheel (not shown). Thus the hub and wheel rotate about axle 22.

As shown most clearly in FIG. 5, quick-release mechanism 28 is located at one end of axle 22, and lever arm 20 is integrally formed with mechanism 28. Quick-release mechanism 28 includes a skewer rod 40 with threaded ends, on which are located end nuts. End nut 35, shown in FIG. 1, is located on one end of skew rod 40. The other end nut is inside the quick-release mechanism 28 in the present embodiment. End nut 35 may be tapered to prevent it from being removed with a wrench while the lock system is in place.

The ends of forks 26 and 27 are usually split to receive the axle 22. The end of fork 26 is positioned over axle 22 between axle nut 38 and quick-release mechanism 28. The end of fork 27 is positioned over axle 22 between another axle nut (not shown) and end nut 35. Rotation of lever arm 20 acts to tighten or loose the end nuts on the skewer rod 40, thereby tightening or loosening the forks 26 and 27 on axle 22. Lever arm 20 has a locked position and an unlocked position. It is impossible to rotate lever arm 20 in its locked position.

When this invention is in use, movement of lever arm 20 to the unlocked position is prevented through the use of body 24 and lock 18. Lock 18 is shown here as a padlock, although other lock types may be used. As can be seen in FIGS. 3 and 4, body 24 is preferably in the form of a generally flat and rectangular plate with two openings, here in the form of holes 32 and 33, formed therein, spaced from each other and near either end of plate 24.

Referring again to FIGS. 1 and 5, either hole 32 or hole 33 is placed over skewer rod 40 on the inside of quick-release mechanism 28. The only requirement is that the diameter of the hole 32 or 33 placed over the skewer rod 40 is slightly larger than the outside diameter of skewer rod 40 while the diameter of the remaining hole is slightly larger than the shackle of the padlock used. Quick-release mechanism 28 is tightened and lever arm 20 is placed in its locked position, which prevents it from being rotated. Plate 24 is held securely between the end of axle 22 and quick release mechanism 28, and is positioned to receive shackle 17 of lock 18 through the remaining hole in such a way that shackle 17 is also placed around lever arm 20 to prevent lever arm 20 from being moved out of its locked position, and thereby preventing it from being rotated.

It is to be understood that the above descriptions relate to one embodiment of the invention only, and are not intended to limit the invention in any way. Various modifications and equivalents to this embodiment will be evident to one skilled in the art. For example, flat plate 24 could be curvilinear or rectangular in shape and could, space permitting, be cylindrical rather than flat in cross-section. In addition, hole 32 or 33 could be enlarged so that it would fit over the end of axle 22 instead of skewer rod 40. This invention should be read as limited by the claims only.

I claim:

1. A bicycle wheel hub locking device for use in combination with a bicycle wheel hub having a wheel axle and a skewer rod extending through the wheel axle, and having a bicycle wheel quick-release mechanism including a lever arm movable relative to said axle to open and close said mechanism and thereby release or lock said wheel, respectively, said locking device being mounted at an end of said skewer rod, adjacent said mechanism, and comprising a body having a first opening and a second opening formed therethrough and spaced from one another; said first opening being of a dimension appropriate to receive said end of said skewer rod of said bicycle quick-release mechanism; said second opening being of a dimension appropriate to receive a lock shackle; said body being sized appropriately so that when said first opening receives said skewer rod, said lock shackle is able to be placed through said second opening and around said lever arm of said bicycle quick-release mechanism on said bicycle wheel hub, thereby preventing the movement of said lever arm out of its closed position and to lock said wheel on said bicycle.

2. A bicycle wheel hub locking device for use in combination with a bicycle wheel hub having a wheel axle and a skewer rod extending through the wheel axle, and having a bicycle wheel quick-release mechanism including a lever arm movable relative to said axle to open and close said mechanism and thereby release or lock said wheel, respectively, said locking device being mounted at an end of said axle and comprising a body having a first opening and a second opening formed therethrough and spaced from one another; said first opening being of a dimension appropriate to receive said axle; said second opening being of a dimension appropriate to receive a lock shackle; said body being sized appropriately so that when said first opening receives said axle, said lock shackle is able to be placed through said second opening and around said lever arm of said bicycle quick-release mechanism on said bicycle wheel hub, thereby preventing the movement of said lever arm out of its closed position and to lock said wheel on said bicycle.

3. A bicycle wheel hub locking device in accordance with claim 1 or 2, wherein said body is a plate having a flat and rectangular shape.

4. A bicycle wheel hub locking device in accordance with claim 3, wherein said openings comprise holes having a generally circular shape, said holes being formed into said plate and near opposite ends thereof.

5. A means for locking a bicycle wheel in operating position on the frame of a bicycle comprising the combination of
(a) a bicycle wheel hub mounted on a bicycle wheel axle, said axle including a skewer rod extending therethrough and a quick-release mechanism having a lever arm, said mechanism being mounted at one end of said skewer rod;
(b) a locking means; and
(c) a locking body having a plurality of openings formed therein, one of said openings in said locking body functioning to mount said locking body over an end of said skewer rod to position the locking body adjacent the end of said wheel axle and said lever arm of said quick-release mechanism; another of said openings being positioned adjacent said lever arms and receiving a portion of said locking means therethrough, said locking means cooperating with said locking body and said lever arm to prevent movement of said lever arm and operation of said quick-release means, thereby preventing removal of the bicycle wheel.

6. A means for locking a bicycle wheel in operating position on the frame of a bicycle comprising the combination of
   (a) a bicycle wheel hub mounted on a bicycle wheel axle, said axle including a skewer rod extending therethrough and a quick-release mechanism having a lever arm, said mechanism being mounted at one end of said skewer rod;
   (b) a locking means; and
   (c) a locking body having a plurality of openings formed therein, one of said openings in said locking body functioning to mount said locking body over an end of said axle to position the locking body adjacent the end of said wheel axle and said lever arm of said quick-release mechanism; another of said openings being positioned adjacent said lever arm and receiving a portion of said locking means therethrough, said locking means cooperating with said locking body and said lever arm to prevent movement of said lever arm and operation of said quick-release means, thereby preventing removal of the bicycle wheel.

* * * * *